(12) United States Patent
Fox et al.

(10) Patent No.: US 10,963,144 B2
(45) Date of Patent: Mar. 30, 2021

(54) GRAPHICALLY ORGANIZING CONTENT IN A USER INTERFACE TO A SOFTWARE APPLICATION

(71) Applicant: Microsoft Technology Licensing, LLC, Redmond, WA (US)

(72) Inventors: Seth Fox, Seattle, WA (US); Yibing Zhu, Woodinville, WA (US); Rolf Arnold Ebeling, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 15/834,484

(22) Filed: Dec. 7, 2017

(65) Prior Publication Data

US 2019/0179519 A1    Jun. 13, 2019

(51) Int. Cl.
| | |
|---|---|
| *G06F 3/01* | (2006.01) |
| *G06F 3/0484* | (2013.01) |
| *G06F 3/0488* | (2013.01) |
| *G06T 11/20* | (2006.01) |
| *G06F 16/26* | (2019.01) |
| *G06F 40/171* | (2020.01) |

(Continued)

(52) U.S. Cl.
CPC ...... *G06F 3/04845* (2013.01); *G06F 3/04883* (2013.01); *G06F 16/26* (2019.01); *G06F 40/171* (2020.01); *G06F 40/177* (2020.01); *G06T 11/206* (2013.01); *G06F 40/18* (2020.01); *G06T 2200/24* (2013.01)

(58) Field of Classification Search
CPC ............ G06F 3/04845; G06F 3/04883; G06F 17/245; G06F 9/44; G06F 3/0481; G06F 3/0488; G06F 16/248; G06F 16/242; G06F 16/2465; G06F 16/26; G06F 3/017; G06F 3/048; G06F 3/04842; G06T 11/206; G06T 2200/24; G06T 11/20; G06T 11/60
USPC ........................................................ 715/781
See application file for complete search history.

(56) References Cited

U.S. PATENT DOCUMENTS 6,459,442 B1 * 10/2002 Edwards .............. G06F 3/04883
 715/700
2005/0091576 A1 * 4/2005 Relyea .................... G06F 9/451
 715/211

(Continued)

OTHER PUBLICATIONS

Noah, William W., "The integration of the World Wide Web and intranet data resources", In Proceedings of Thirty-First Annual Hawaii International Conference on System Sciences, Jan. 6, 1998, 7 Pages.

(Continued)

*Primary Examiner* — Justin S Lee

(57) ABSTRACT

Systems, methods, and software are disclosed herein for graphically organizing content in a user interface to a software application. A visual representations of data objects is presented on a canvas in the user interface. User input is received indicative of at least a visual construct for arranging the visual representations of the data objects on the canvas and criteria for arranging the visual representations of the data objects with respect to the visual construct. Data associated with each of the data objects that relates to the criteria is then identified. Each of the visual representations of data objects are placed on the visual construct based on the data related to the criteria.

20 Claims, 11 Drawing Sheets

(51) Int. Cl.
*G06F 40/177* (2020.01)
*G06F 40/18* (2020.01)

(56) References Cited

U.S. PATENT DOCUMENTS

| | | | |
|---|---|---|---|
| 2005/0275622 A1* | 12/2005 | Patel | G06T 11/206 345/156 |
| 2006/0206512 A1* | 9/2006 | Hanrahan | G06F 17/30554 |
| 2008/0159625 A1* | 7/2008 | Bhaskarabhatla | G06K 9/00409 382/179 |
| 2009/0282349 A1* | 11/2009 | Olsen | G06F 9/44505 715/760 |
| 2010/0088664 A1* | 4/2010 | Khodabandehloo | G06F 8/20 717/103 |
| 2012/0011465 A1* | 1/2012 | Rezende | G06F 3/0481 715/786 |
| 2012/0229468 A1* | 9/2012 | Lee | G06F 9/451 345/440 |
| 2012/0229470 A1* | 9/2012 | Nagai | G06F 3/04883 345/440 |
| 2013/0222385 A1* | 8/2013 | Dorsey | G06T 19/00 345/427 |
| 2014/0053091 A1* | 2/2014 | Hou | G06F 3/04883 715/769 |
| 2014/0372858 A1* | 12/2014 | Campbell | G06F 40/18 715/220 |
| 2015/0015504 A1* | 1/2015 | Lee | G06F 3/04845 345/173 |

OTHER PUBLICATIONS

"International Search Report and Written Opinion Issued in PCT Application No. PCT/US2018/061403", dated Jan. 25, 2019, 11 Pages.

* cited by examiner

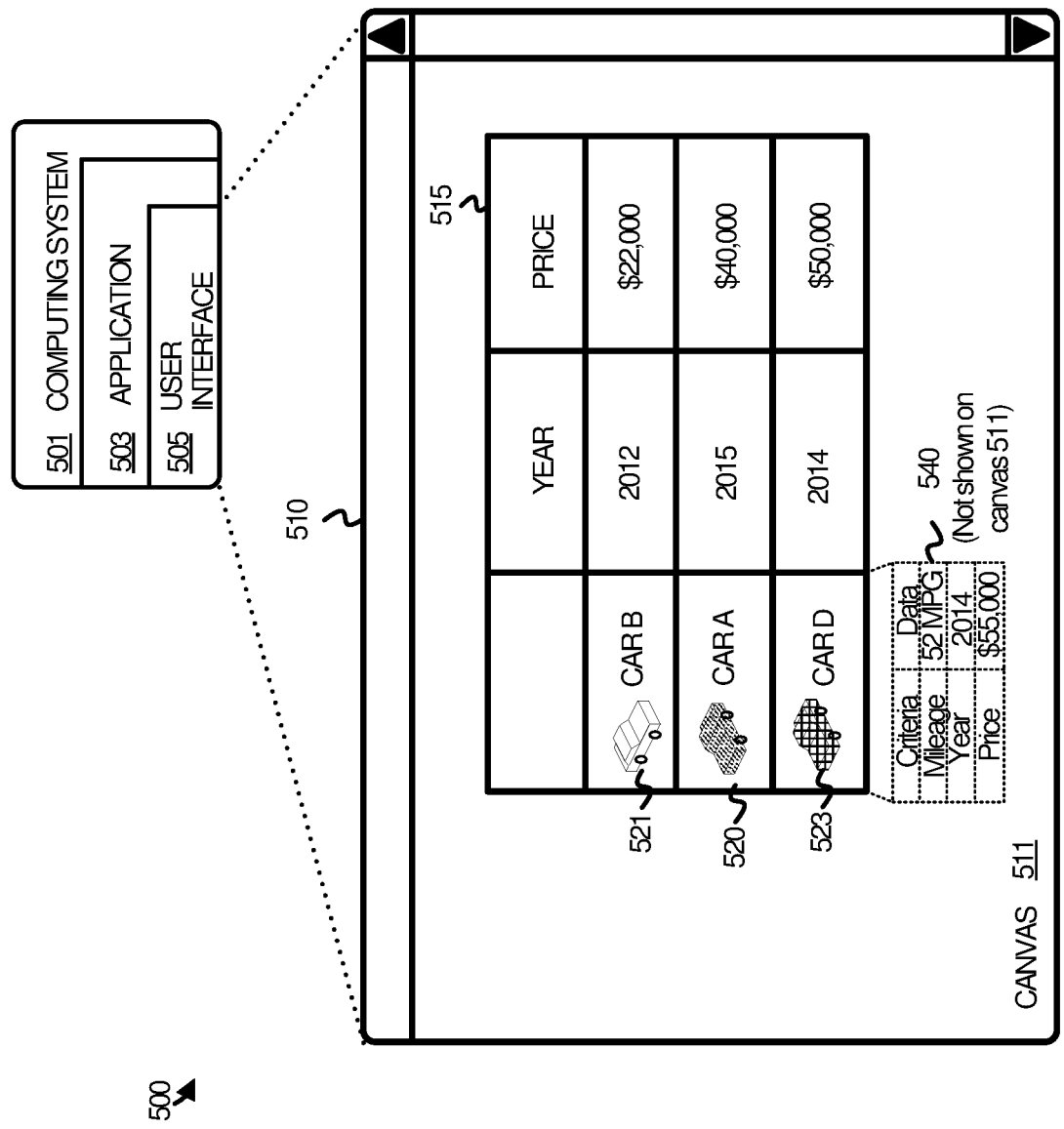

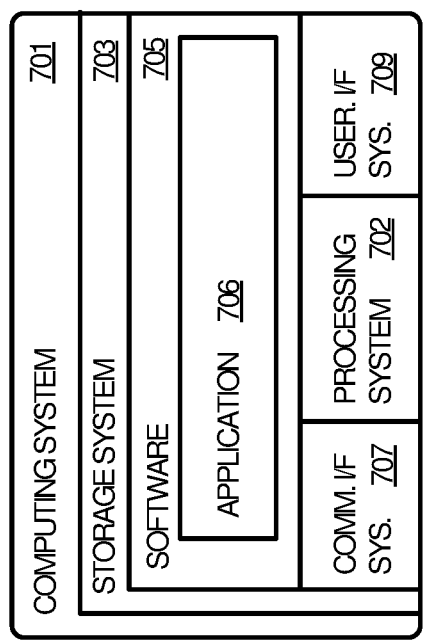

GRAPHICALLY ORGANIZING CONTENT IN A USER INTERFACE TO A SOFTWARE APPLICATION

TECHNICAL FIELD

Aspects of the disclosure are related to computing hardware and software technology, and in particular to graphically organize content in a user interface to a software application.

TECHNICAL BACKGROUND

Many software applications provide a digital canvas that allow users to render photos, create shapes and images, write notes, chart data, highlight text, and otherwise interact with content in a user interface to an application. Digital canvases may be found in a variety of applications, including note taking applications, productivity applications, and graphic design applications, and may be especially useful in the context of touch-based surfaces. Digital canvases are often used to gather information and generate content. The content may be illustrated in various forms, such as photos, sticky notes, articles, charts, documents, handwritten notes, among other items displayed on the digital canvas for a user.

Some users of a digital canvas application may want to build content connections and visually arrange items in a structured and meaningful manner One solution for organizing content on a digital canvas involves a user manually moving items into a desired location on the canvas. For example, a user would arrange images on a table by manually placing the image in a space on a table. When dealing with only a few items, things become fairly simple. However, manually moving each item when a large number of items are present may become tedious and inefficient.

Other solutions for organizing content on a digital canvas require a user to first organize data associated with an item in a separate application and then copy the previously organized data onto the digital canvas. Unfortunately, these other applications may not be compatible in how the data associated with the items are displayed on the canvas. For example, the other application may only be capable or sorting numerical items and not be capable to arranging an item in the form of an image that has associated data. Like manual solutions, this method is tedious for the user as well as inefficient from a processing standpoint. Moreover, current applications do not analyze data associated with an item. This limits an ability of the application to enhance a user experience when graphically organizing content on a digital canvas in a user interface.

OVERVIEW

An enhanced system, method, and software application is disclosed herein that improves graphically organizing content in a user interface. A visual representations of data objects is presented on a canvas in the user interface. User input is received indicative of at least a visual construct for arranging the visual representations of the data objects on the canvas and criteria for arranging the visual representations of the data objects with respect to the visual construct. Data associated with each of the data objects that relates to the criteria is then identified. Each of the visual representations of data objects are placed on the visual construct based on the data related to the criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 5A-5B illustrate an alternative operational architecture in an implementation of an enhanced canvas application.

FIG. 7 illustrates a computing system suitable for implementing the canvas technology disclosed herein, including any of the architectures, processes, operational scenarios, and operational sequences illustrated in the Figures and discussed below in the Technical Description.

TECHNICAL DESCRIPTION

Figure 1:
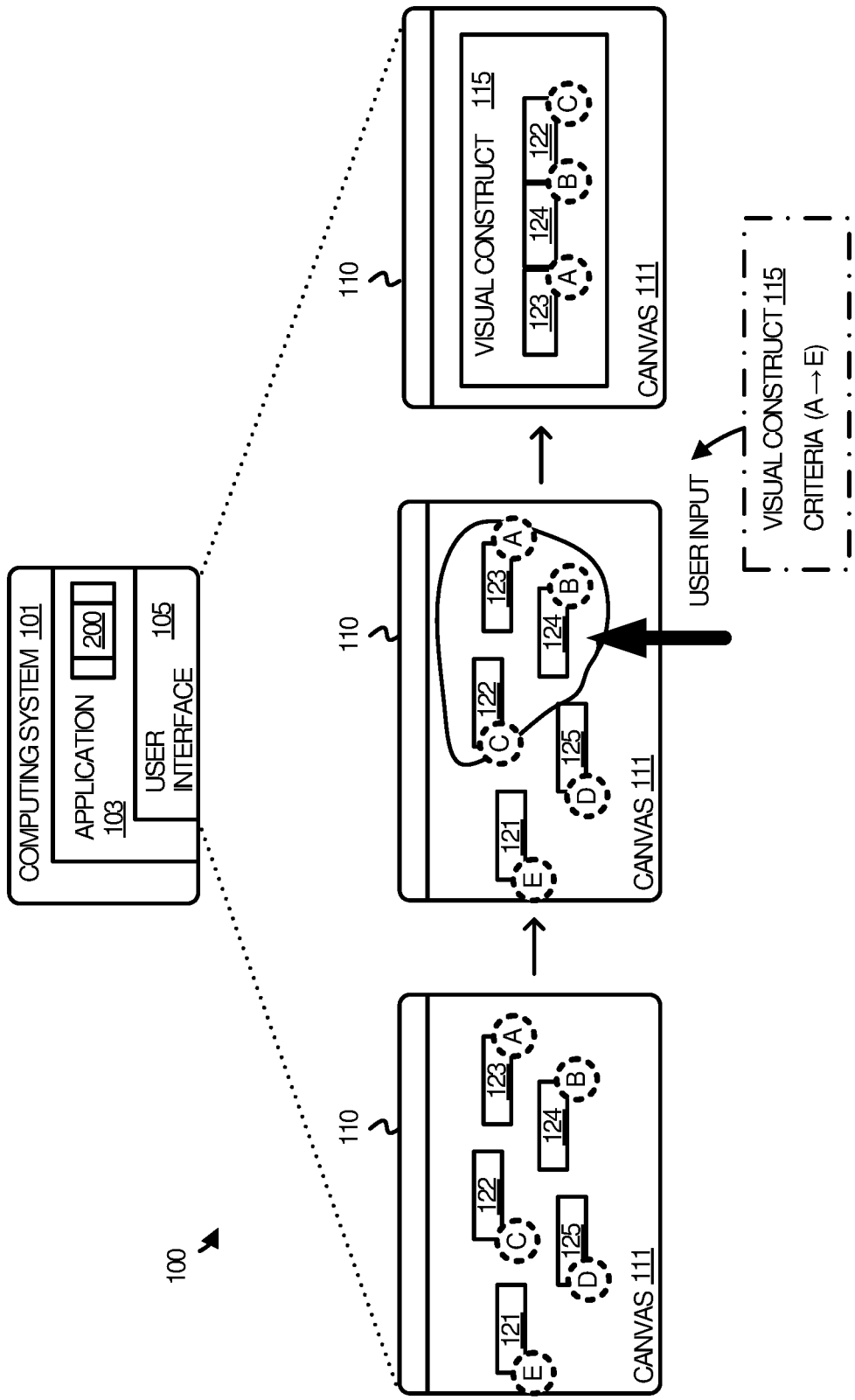
FIG. 1 illustrates an operational architecture for implementing an enhanced canvas application to graphically organize content in a user interface.

Examples of the present disclosure describe a canvas application graphically organizing content in a user interface. The implementations described herein are configured to present a visual representations of data objects on a canvas in the user interface. User input is received indicative of at least a visual construct for arranging the visual representations of the data objects on the canvas and criteria for arranging the visual representations of the data objects with respect to the visual construct. Data associated with each of the data objects that relates to the criteria is then identified. Each of the visual representations of data objects are placed on the visual construct based on the data related to the criteria.

A technical effect that may be appreciated from the present discussion is the increased efficiency in identifying data of the data object (e.g., determining numerical data associated with an item displayed on the canvas as a photo) and arranging the data objects on a visual construct based on the associated data. The canvas application described herein also improves the efficiency in allowing users to create the visual construct that automatically identifies the data that are to be used to arrange the data objects without requiring the user to associate the data on the visual construct with data of the data objects (e.g., a user labels an axis on a graph with data and the data is identified for each data item and the visual representations of data items are graphed based on the identified data).

Further, examples herein described that the user input comprises digital inking on the canvas that is representative of at least the visual construct and the criteria. In other examples, the visual construct for arranging the visual representations of data objects comprises a graph and the criteria comprises a label for each axis of the graph. In a further example, the canvas application identifies a scale for each axis on the graph based on the data associated with each of the data objects. In this scenario, the canvas application may place each of the visual representations of the data objects on the visual construct based on the data related to the criteria and the identified scale for each axis on the graph.

In some implementations, the visual construct for arranging the visual representations of data objects comprises a table. Further in this example, the criteria may comprise a label for each column or row on the table. The canvas application may then place each of the visual representations of the data objects on the visual construct based on the data related to the criteria and the labeled rows or columns of the visual construct.

Processing operations may identify metadata indicating the data associated with each of the data objects the visual construct for arranging the visual representations of data objects. Alternatively, each of the data objects may comprise an embedded link to a data source. In this scenario, identifying the at least one data for each of the data objects in the visual representations of data objects comprises querying the data source for the at least one data.

In some scenarios, the canvas application may further extend to receiving a sort command on the canvas in the user interface that places select visual representations of data objects on the visual construct. The selected visual representations of data objects may then be arranged in the visual construct based on the received sort command. In other examples described herein, the canvas application may further receive an erase command on the canvas in the user interface that is associated with at least one of a data object or criteria. The canvas application may then remove the at least one of the data object or the criteria from the visual construct when arranging the visual representations of data objects on the canvas in the user interface.

Referring to the drawings, FIG. 1 illustrates an exemplary operational architecture 100 related to processing operations for management of an exemplary enhanced canvas system with which aspects of the present disclosure may be practiced. Operational environment 100 includes computing system 101 on which application 103 runs. Application 103 employs an arranging process 200 in the context of producing views in a user interface 105. View 110 includes canvas 111 which displays visual representations of data objects 120-125 to users. View 110 is representative of a view that may be produced by application 103 in user interface 105.

Computing system 101 is representative of any device capable of running an application natively or in the context of a web browser, streaming an application, or executing an application in any other manner Examples of computing system 101 include, but are not limited to, personal computers, mobile phones, tablet computers, desktop computers, laptop computers, wearable computing devices, or any other form factor, including any combination of computers or variations thereof. Computing system 101 may include various hardware and software elements in a supporting architecture suitable for providing application 103. One such representative architecture is illustrated in FIG. 7 with respect to computing system 701.

Application 103 is representative of any software application or application component capable of graphically organizing content in accordance with the processes described herein. Examples of application 103 include, but are not limited to, presentation applications, diagraming applications, computer-aided design applications, productivity applications (e.g. word processors or spreadsheet applications), and any other type of combination or variation thereof. Application 103 may be implemented as a natively installed and executed application, a web application hosted in the context of a browser, a streamed or streaming application, a mobile application, or any variation or combination thereof.

View 110 is representative of a view that may be produced by a drafting and authoring application, such as Word® from Microsoft®, although the dynamics illustrated in FIG. 1 with respect to view 110 may apply to any other suitable application. View 110 includes canvas 111 on which a user may include data objects 120-125, such as photos, text, documents, articles, or handwritten notes, for example. An end user may interface with application 103 to produce flow charts, diagrams, basic layout drawings, or any other type of presentation on canvas 111. It should be noted that each of data objects 120-125 includes a visual representation displayed to the user on canvas 111 and data which may not be displayed to the user (e.g., A, B, C, D, and E corresponding to each of the data objects on canvas 111).

The user may interface with application 103 using an input instrument such as a stylus, mouse device, keyboard, touch gesture, as well as any other suitable input device. The user may draw free-form lines, write text, attach documents, or otherwise create objects on canvas in furtherance of a given presentation, slide show, document, diagram, or other such content. In an enhancement, application 103 provides the ability to graphically organize content on canvas 111 by way of simply identifying visual construct 115. In some implementations, visual construct 115 may be created by the user handwriting visual construct 115 and naming criteria which is used to arrange data objects 120-125.

Figure 2:
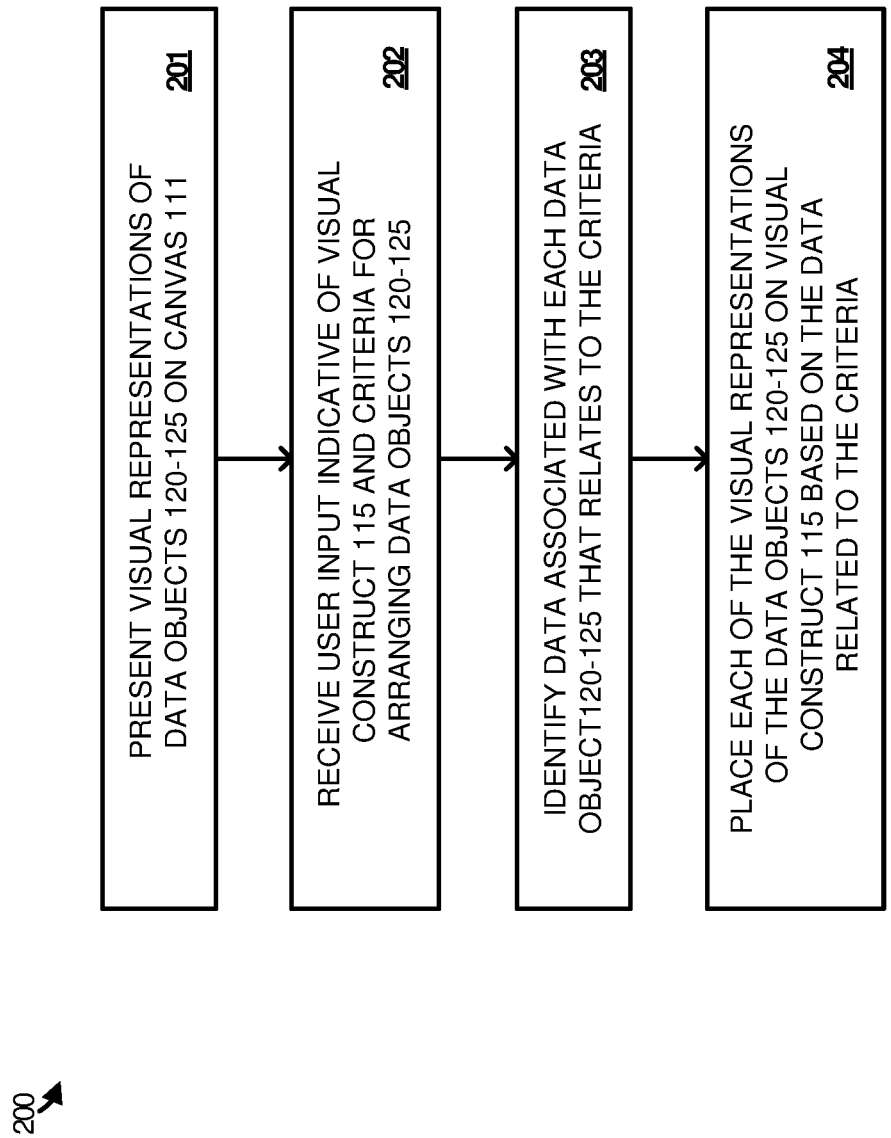
FIG. 2 illustrates an arranging process employed in implementations of an enhanced canvas application.

More particularly, FIG. 2 illustrates arranging process 200 which, as mentioned, may be employed by application 103 to allow graphical organization of content as described herein. Some or all of the steps of arranging process 200 may be implemented in program instructions in the context of a component or components of the application used to carry out the data object arrangement feature. The program instructions direct application 103 to operate as follows, referring parenthetically to the steps in FIG. 2 in the context of FIG. 1.

In operation, application 103 presents presenting visual representations of data objects 120-125 on canvas 111 in user interface 105 (step 201). Application 103 may be configured to enable users to create or edit digital presentation documents. The visual representation of data objects 120-125 may be an image, digital post, icon, or any other visual items that graphically represents objects 120-125 on canvas 111. Each of data objects 120-125 also includes data which is illustrated by the dotted-line circles enclosing characteristic data (e.g., data labels A, B, C, D, and E associated with each of data objects 120-125) in FIG. 1. Although illustrated in FIG. 1, it should be noted that the data associated with each of data objects 120-125 may not be visible to users on canvas 111.

Application 103 may import various data objects onto canvas 111 to be graphically organized by a user. For instance, a user may create data objects 120-125 by uploading or attaching content items including, but not limited to, electronic word documents, spreadsheets, photos, text messages, website links, media content, articles, notes written in digital ink, etc. In alternate examples, data objects 120-125 may be created from scratch, where users can generate new types of electronic data items and incorporate the new content with the data object. Some exemplary canvas applications are further configured to enable users to pull content locally (e.g. from a storage of a specific computing device) or retrieve content via a network connection (e.g. retrieve content from a distributed storage, website, etc.).

The of data objects 120-125 may be retrieved from the same data source, such as a data storage system distributing data related to the visual representations of data objects. In other scenarios, the visual representations of data objects 120-125 may be retrieved from multiple data sources. Data objects 120-125 may additionally be linked to multiple data sources and be able to pull data from each of the data sources associated with each of data objects 120-125. Exemplary data objects 120-125 may also be automatically generated on behalf of the user based on receipt of drag and drop actions, copy and paste actions, import commands, etc.

In a next operation, application 103 receives user input indicative of visual construct 115 for arranging the visual representation of the data objects 120-125 on canvas 111 and criteria for arranging the visual representation of data objects 120-125 with respect to visual construct 115 (step 202). Visual construct 115 is a structure or diagram used to organize and display the visual representations of data objects 120-125 based on data. The criteria indicate the type of data that that is to be used to arrange data objects 120-125, such as data A-E associated with each of data objects 120-125. The criteria may also indicate how the data is to be ordered, such as by descending order, ascending order.

Application 103 may receive user input indicative of visual construct 115 and criteria by receiving an inking input on the canvas in user interface 105. Application 103 may then render visual construct 115 on canvas 111 based on the received inking input. Application 103 may receive the user input using an input instrument such as a stylus, mouse device, keyboard, touch gesture, as well as any other suitable input device. The user may draw free-form lines, write text, attach documents, or otherwise create visual construct 115 and indicate the criteria for arranging the visual representations of data objects 120-125 on canvas 111.

Application 103 may also identify visual construct 115 based on a user selection from a visual construct menu, a user import of a visual construct from another application or service, or some other method of incorporating visual construct 115 onto canvas 111. Application 103 may then identify the criteria by receiving digital inking on the visual construct (e.g., handwriting labels on the axes of a graph). In other scenarios, anticipated criteria may be prompted to a user based on the types of data associated with data objects 120-125, historical user preferences, or some other method of determining a user intention for arranging data objects 120-125 on visual construct 115.

In some examples, visual construct 115 for arranging the visual representations of data objects may be a graph and the criteria may comprise a label for each axis on the graph. Each of data objects 120-125 in the visual representations of data objects may then comprise a point on the graph. In other scenarios, visual construct 115 for arranging the visual representations of data objects comprises a table. The criteria may comprise a label for a row or a column on the table. Further, each of data objects 120-125 in the visual representations of data objects 120-125 may then comprise a data entry on the table.

In a next operation, application 103 identifies data associated with each of the data objects that relates to the criteria (step 203). The data may comprise characteristic information associated with data objects 120-125. For example, data objects 120-125 may be archived weather reports for each month. Data objects 120-125 may be visually represented by images, such as a photo of calendar month. Each of data objects 120-125 also includes various data not that is not visually represented on canvas 111 (e.g., data A, B, C, D, and E). For example, the data may indicate average rainfall in each month, number of sunny days in each month, etc. Although this information may not be visually represented directly on canvas 111, the data (e.g., weather statistics) associated with data object 120-125 (e.g., the archived weather report for each month) may be identified by application 103.

Each of data objects 120-125 may include metadata indicating the various data associated with each of data objects 120-125 in the collection. The metadata may have been included with each of data objects 120-125 by the user or included by a data source from which each of data objects 120-125 is originated from. Alternatively, each of data objects 120-125 may include a pointer to a locally stored file or folder containing the data, such as a text document, spreadsheet, or some other file or folder containing information relating data to each of data objects 120-125.

In some implementations, each of data objects 120-125 includes an embedded link to a data source, such as an external storage device or a website. Application 103 may then identify the at least one data for each of data objects 120-125 in the visual representations of data objects by querying the data source for the data. For example, each of data objects 120-125 may include a link to a distributed storage system that contains various data for the data object in which the data object originated from. It should be noted that the data may be determined and linked to each of data objects 120-125 at the time that the data object was created. However, application 103 may also identify the data associated with each of data objects 120-125 at a later time or in real-time when the need to identify the data occurs. For example, application 103 may query the distributed storage system for the data once a graph has been created identifying criteria not previously included in the metadata associated with data objects 120-125.

In a final operation, application 103 places each of the visual representations of data objects 120-125 on visual construct 115 based on the data related to the criteria (step 204). Application 103 may place each of the visual representations of data objects 120-125 on visual construct 115 by modifying the visual representation of data objects 120-125. For example, data objects 120-125 may be flipped, invoked, rearranged, or modified to reveal or hide data to be displayed on canvas 111 of user interface 105. Application 103 may place the visual representations of data objects 120-125 in visual construct 115 by arranging each of the visual representations of data objects 120-125 on a graph based on the data identified for each of data objects 120-125 associated with the criteria that was indicated by the labeled axes on the graph.

Application 103 may further identify a scale for each axis on the graph based on the data associated with each of data objects 120-125. In this scenario, application 103 may place each of the visual representations of data objects 120-125 on the visual construct based on the data related to the criteria and the identified scale for each axis on the graph. In other scenarios, application 103 may place the visual representations of data objects 120-125 in visual construct 115 by arranging each of the visual representations of data objects 120-125 on a table based on data identified for each of data objects 120-125 associated with the criteria that was indicated by the rows or the columns labeled on the table.

Application 103 may further receive a sort command on canvas 111 in user interface 105 that places only select visual representations of data objects 120-125 on visual construct 115. In this scenario, application 103 would then place the visual representations of data objects 120-125 in visual construct 115 by arranging the selected visual representations of data objects 120-125 in visual construct 115 based on the received sort command. In some scenarios, application 103 further receives an erase command on canvas 111 in user interface 105 that is associated with at least one of data objects 120-125 or the criteria. In response to receiving the erase command, application 103 may remove the data object or criteria from visual construct 115 when arranging the visual representations of data objects on canvas 111 in user interface 105.

Figure 3A:
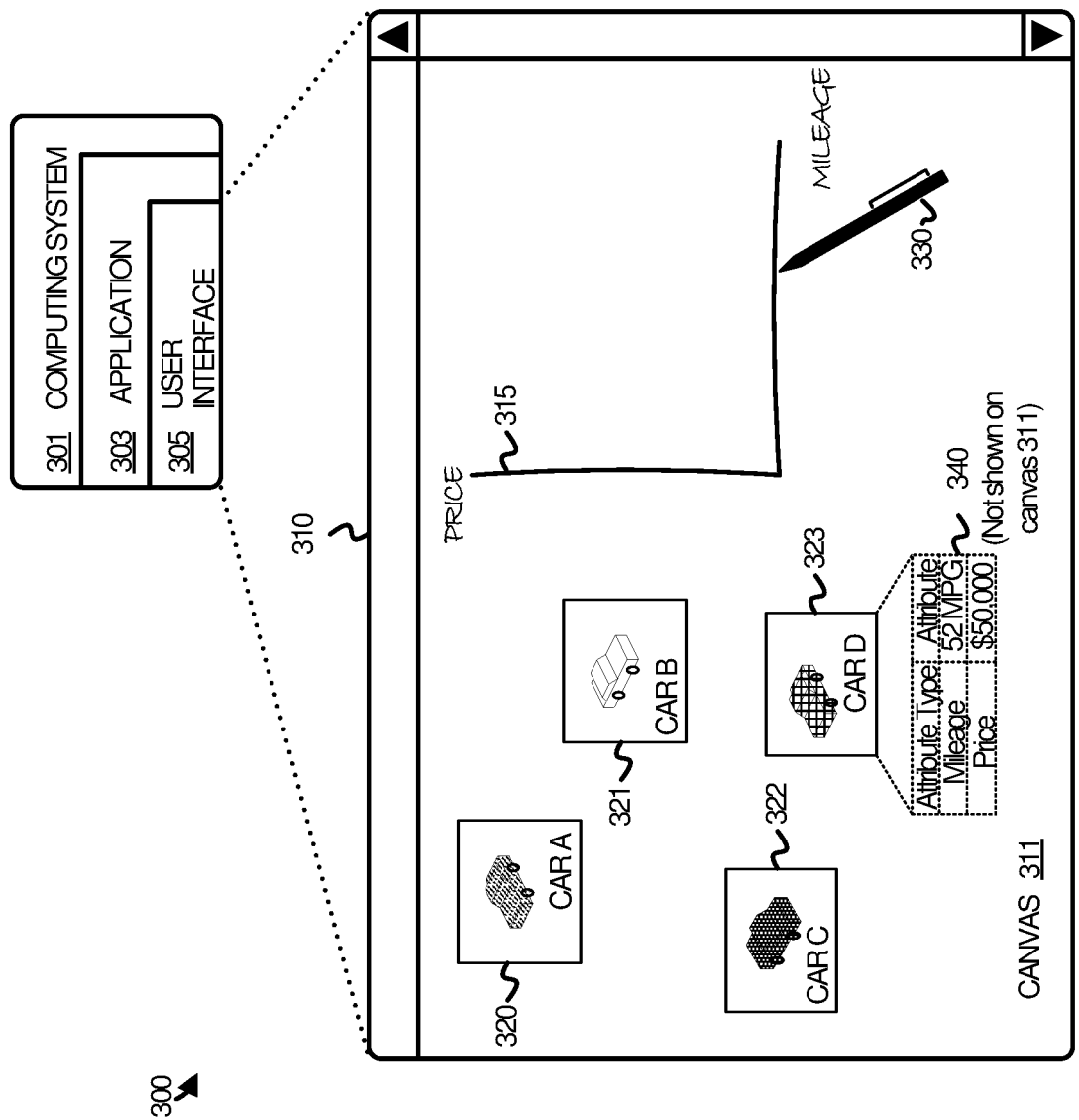
FIGS. 3A-3B illustrate an operational scenario in an implementation of an enhanced canvas application.

FIGS. 3A-6B illustrate various operational architectures for graphically organizing content in a user interface to a software application that may be used in one or more scenarios of the present technology. In particular, FIGS. 3A-3B illustrate an operational scenario 300 that relates to what occurs when a user draws a graph on the canvas and the application automatically populates the graph with the data objects based on the labeled axes. Operational scenario 300 includes computing system 301, application 303, user interface 305, view 310, and canvas 311. As illustrated in operational scenario 300, a user has previously inserted various data objects 320-323 onto the canvas. In this scenario, each of the images of data objects 320-323 represents a car entity, such as Car A, Car B, Car C, and Car D. Each of data objects 320-323 includes metadata indicating various data associated with each of the images of data objects 320-323. The metadata may have been included with each of data objects 320-323 by the user or included by a data source from which each of data objects 320-323 is originated from.

Referring to FIG. 3A, a user has created data objects 320-323, each representing a car. Each of data objects 320-323 includes an image component which can be seen on canvas 311. However, each of data object 320-323 includes associated data which is not shown on canvas 311 (indicated by the dotted-lined data structure). For example, Car D is associated with two criteria (e.g., mileage and price), and the data for each of the criteria (e.g., 36 Miles Per Gallon (MPG) and $45,000). The data for each criteria may be included in the metadata for data objects 320-323, included in a local file or folder pointed to by data objects 320-323, contained in an external storage device or on a website, or included by some other technique which allows application 303 to access data associated with data objects 320-323. Graph 315 has been drawn on canvas 311 using digital inking stylus 330. The user has also written labels on the graph identifying the axes of the graph. In this example, the x-axis has been labeled "mileage" and the y-axis has been labeled "price".

Figure 3B:
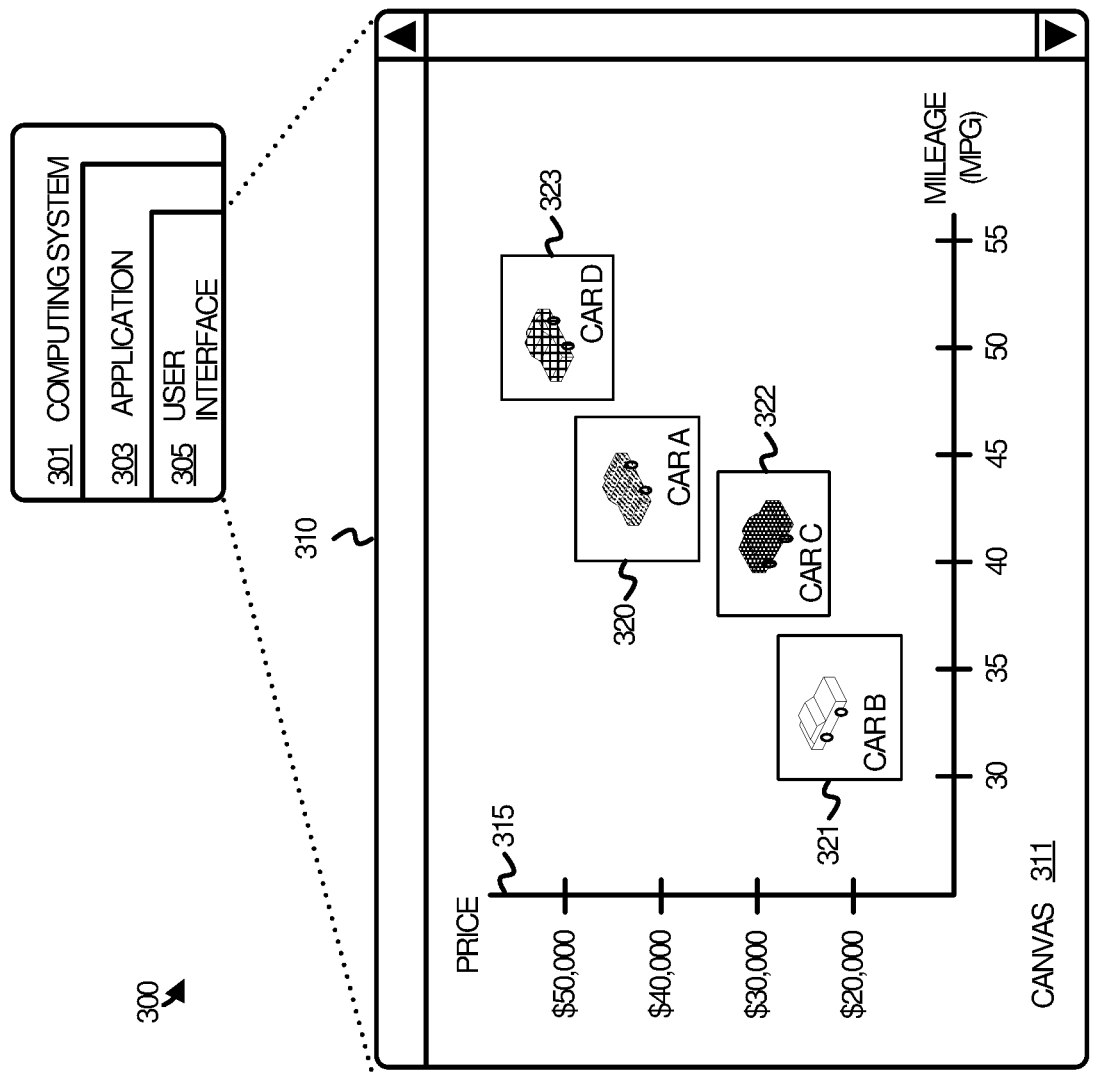

Referring next to FIG. 3B, the visual representations of data objects 320-323 are presented and identified on canvas 311 in user interface 305 to application 303. The data for each of data objects 320-323 representing Cars A-D are identified by application 303. Application 303 also identifies graph 315 and the criteria (i.e., mileage and price) labeled on the graph. Application 303 then arranges each of data objects 320-323 on graph 315 according to each of their data values corresponding to the criteria labeled on the graph. For example, application 303 may determine that the metadata indicating a value of MPS corresponds to the data labeled "mileage" and the value of dollars corresponding to the data labeled "price" for each of data objects 320-323.

Application 303 then arranges Cars A-D for the visual representations of data objects on canvas 311 in user interface 305 based on the data identified for each of data objects 320-323 in the visual representations of data objects. It should also be noted that application 303 has further identified a scale for each axis on the graph based on the data associated with each of data objects 320-323. In this scenario, Application 303 has placed each of the visual representations of data objects 320-323 on graph 315 based on the mileage and price scale identified for each axis on graph 315.

Figure 4A:
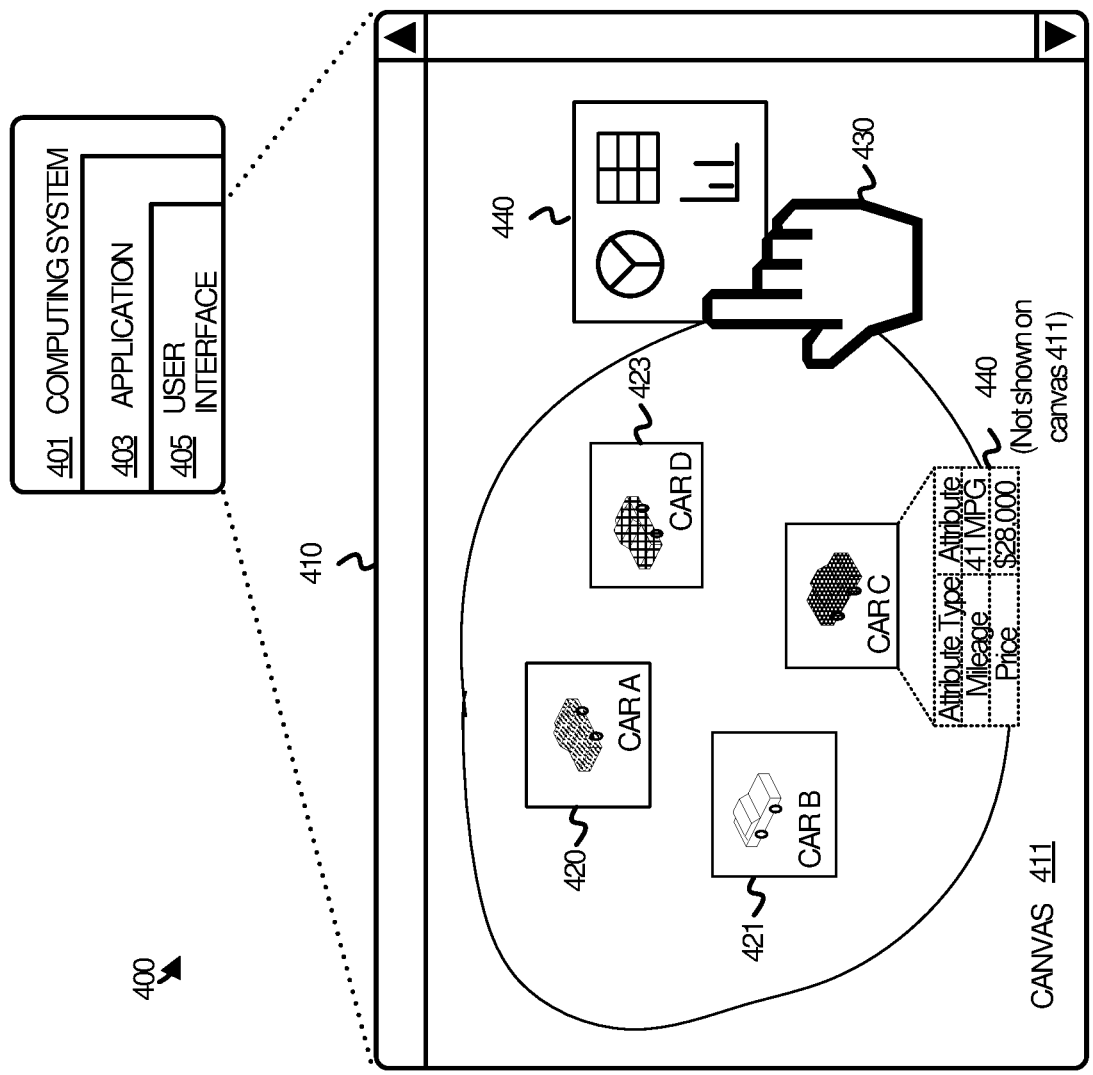
FIGS. 4A-4B illustrate an alternative operational scenario in an implementation of an enhanced canvas application.
Figure 4B:
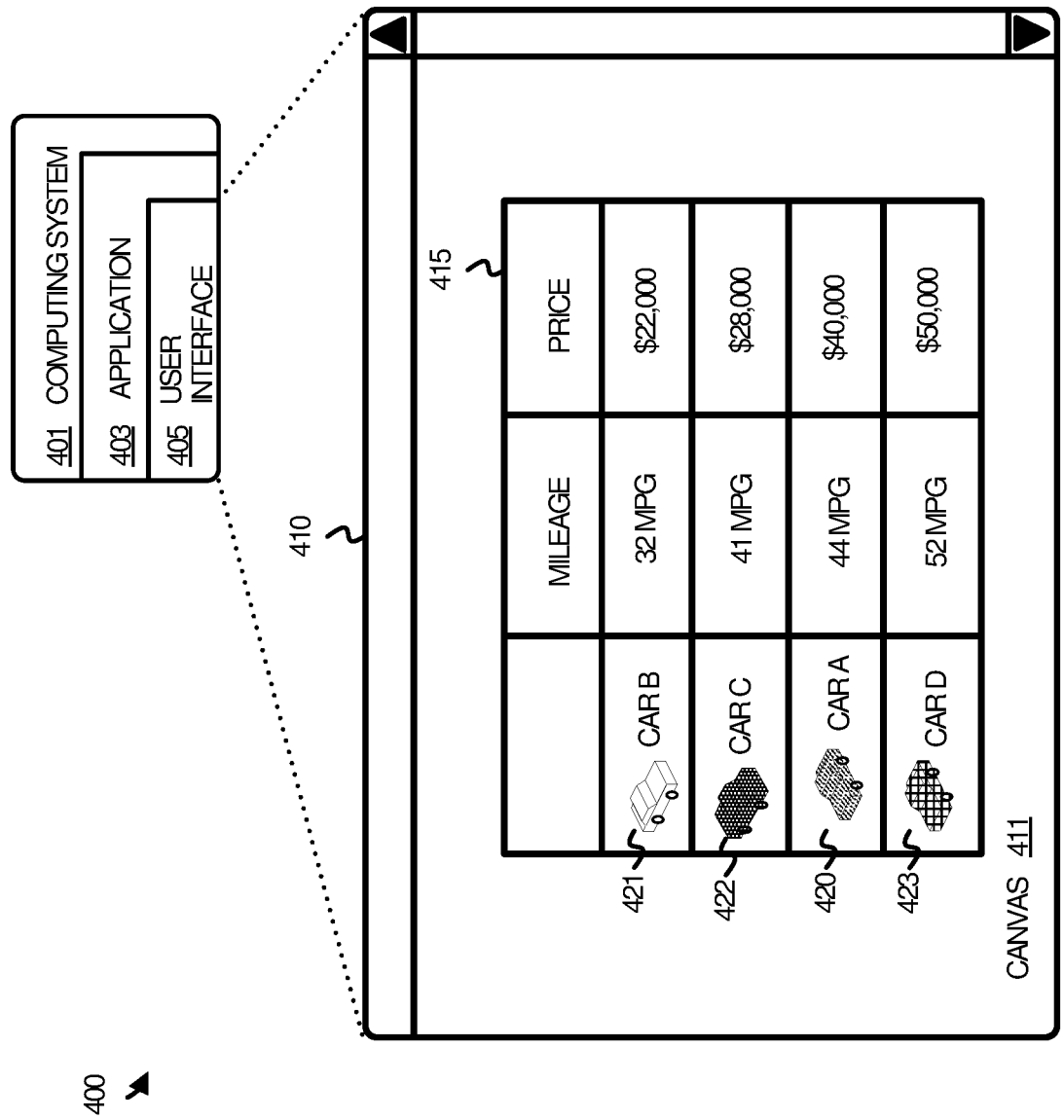

FIGS. 4A-4B illustrate an alternative operational architecture for graphically organizing content in a user interface to a software application that may be used in one or more scenarios of the present technology. FIGS. 4A-4B illustrate an operational scenario 400 that relates to what occurs when a user executes an action to select various data objects and a visual construct for the canvas. Operational scenario 400 includes computing system 401, application 403, user interface 405, view 410, and canvas 411.

Referring to FIG. 4A, a user has again inserted various data objects 420-423 onto canvas 411 representing Car A, Car B, Car C, and Car D. Each of data objects 420-423 includes a pointer to a local file or folder, such as a text document, spreadsheet, or some other file or folder containing information relating data to each of data objects 420-423. Application 403 may also retrieve content via a network connection (e.g. retrieve content from a distributed storage, website, etc.). The pointer or link allow application 403 to access associated data. A user then draws a circle around data objects 420-423 with either a touch input device, a mouse, an audio voice input, or some other selection method. In this scenario, the user has drawn the circle using touch input device, as indicated by the input cursor 430.

Although not shown for clarity the visual constructs may include anticipated criteria in visual construct menu 440 (e.g., tables, bar graphs, pie charts, calculations, etc.) that allow a user to select both a visual construct type and the data associated with the selected visual construct. For example, in response to drawing a circle around data objects 420-423 and receiving a user selection of a visual construct, application 403 may provide an additional prompt for the user to select criteria that are anticipated by application 403 based on current data associated with data objects 420-423, user history, application history, etc.

In other scenarios, application 403 may first prompt the user for a visual construct selection and then the user is prompted to fill in column and/or row names on the visual construct that will then be identified by application 403. In FIG. 4B it can be seen that the user has labeled the first column as "mileage" and the second column as "price" on table 415. Additionally, the data for each of data objects 420-423 representing Cars A-D are identified by application 403. Application 403 then arranges each of data objects 420-423 on table 415 according to each of their data values corresponding to the criteria labeled on the columns of table 415.

Figure 5A:
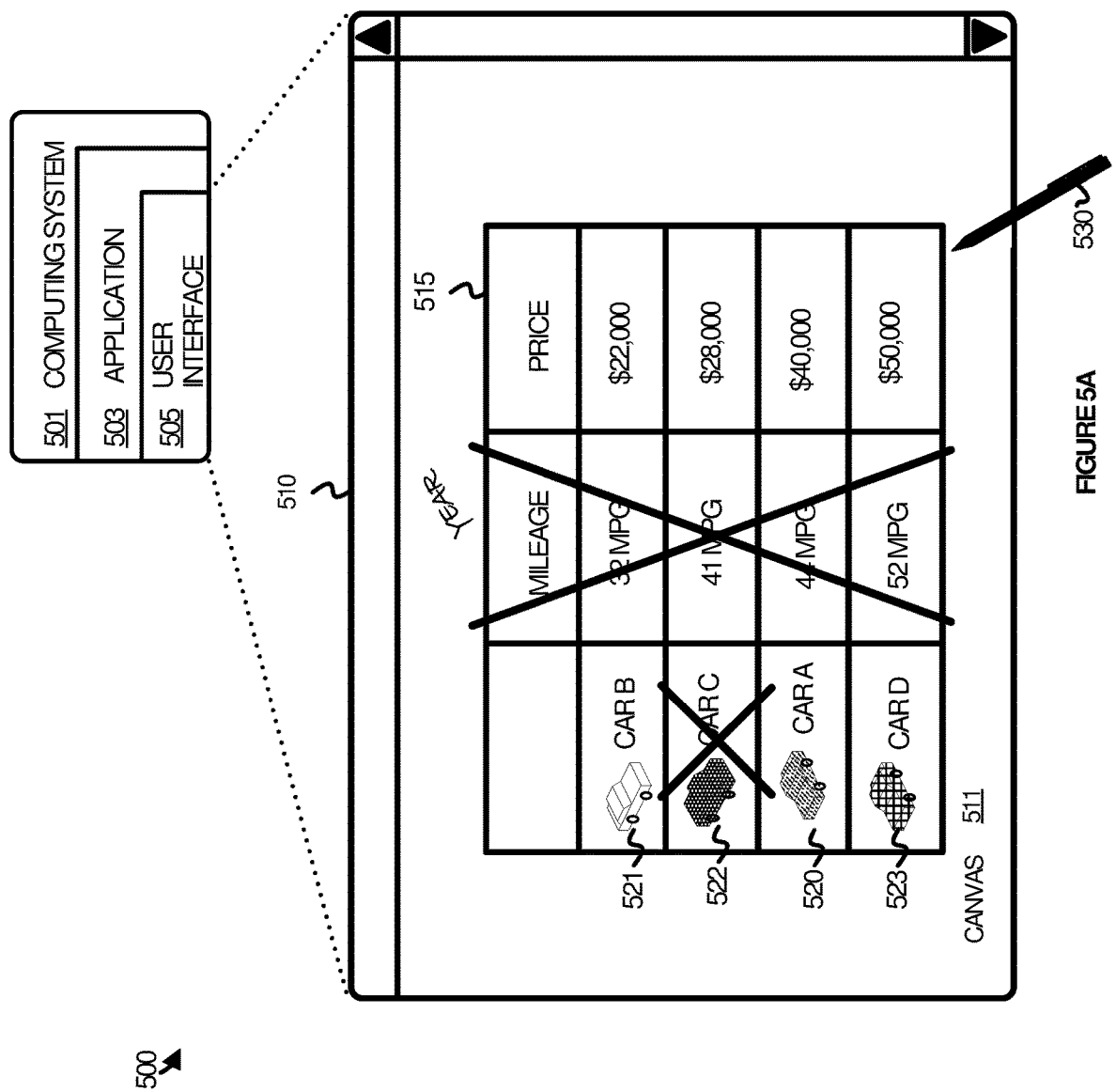

FIGS. 5A-5B illustrate an alternative operational architecture for graphically organizing content in a user interface to a software application that may be used in one or more scenarios of the present technology. FIGS. 5A-5B illustrate an operational scenario 500 that relates to what occurs when a user desires to alter an existing visual construct, such as by removing and adding data objects and/or the criteria. Operational scenario 500 includes computing system 501, application 503, user interface 505, view 510, and canvas 511.

As illustrated in FIG. 5A, application 503 has already created a visual construct (table 515) and arranged data objects 520-523 based on the criteria for arranging the visual representations of the data objects with respect to the data objects. However, the user has used digital inking stylus 530 to cross-out data object 522 (Car C) and the criteria named "mileage." This may be due to the user no longer desiring to compare each of data objects 520-523 based on mileage and no longer is considering Car C in the drafting process on canvas 511. It should also be noted that the user has written a new criteria labeled "year" above the crossed-out criteria labeled "mileage."

Referring to FIG. 5B, application 503 then removes data object 522 (Car C) and the column labeled "mileage" from table 515 on canvas 511. Application 403 also identifies the additional criteria labeled "year" and identifies data from each of data objects 520, 521, and 523 based on the criteria labeled "year." Unfortunately, the criteria "year" was not previously included in the data information for each of the data objects 520-523. Therefore, application 503 determines either a pointer to a local file or folder, or a link to an external website or distributed storage service for each of data objects 520, 521, and 523 to identify the data associated with the new criteria. In response to identifying the addition data for each of the remaining data objects 520, 521, and 523, application 503 then arranges each of data objects 520, 521, and 523 in table 515 on canvas 511 according to each of their data values corresponding to the criteria labeled in the columns of table 515.

Figure 6A:
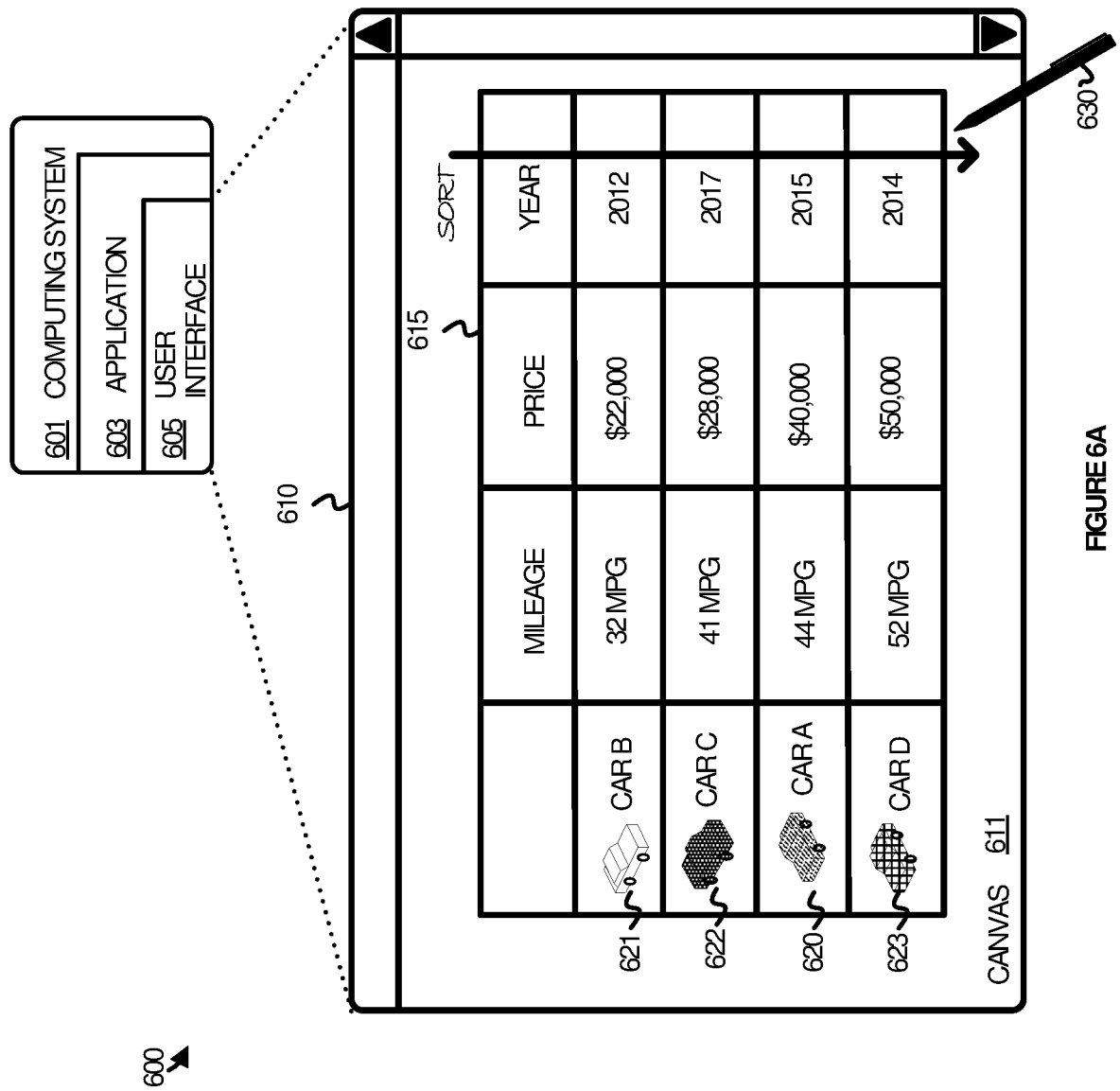
FIGS. 6A-6B illustrate an alternative operational architecture in an implementation of an enhanced canvas application.
Figure 6B:
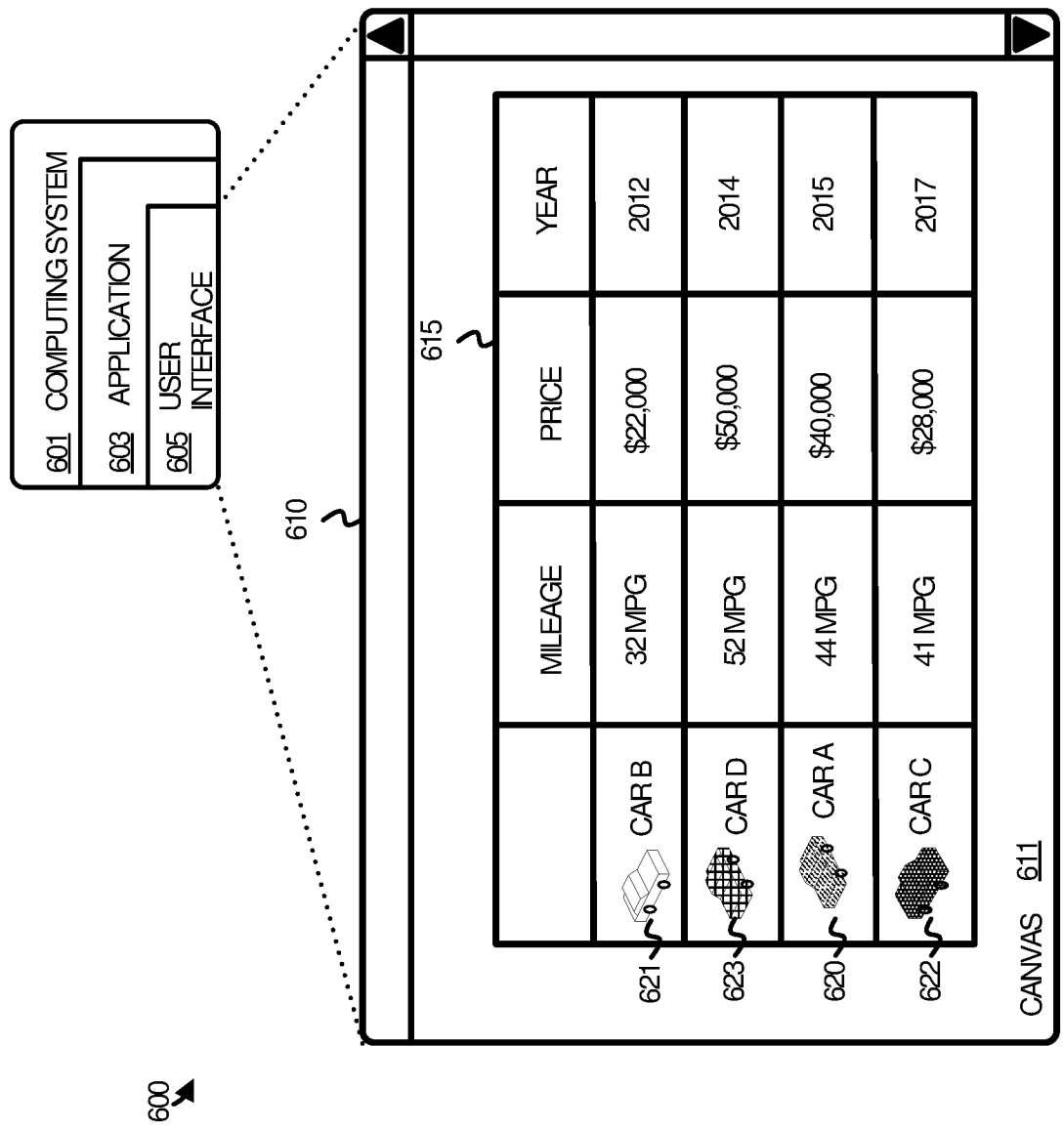

FIGS. 6A-6B illustrate an alternative operational architecture for graphically organizing content in a user interface to a software application that may be used in one or more scenarios of the present technology. FIGS. 6A-6B illustrate an operational scenario 600 that relates to what occurs when a user desires to sort data objects based on selected criteria in an existing visual construct. Operational scenario 600 includes computing system 601, application 603, user interface 605, view 610, and canvas 611.

As illustrated in FIG. 6A, application 603 has already created a visual construct (table 615) and arranged data objects 620-623 based on the criteria for arranging the visual representations of the data objects with respect to the data objects. However, the user has used digital inking stylus 630 to draw a line through the column labeled "year" on table 615. This indicates a command that table 615 should be sorted based on the year, not the price or mileage criteria. It should also be noted that the line drawn down the column labeled "year" indicating the sort command also includes an arrow. The arrow indicates whether data objects 620-623 should be sorted in descending order or ascending order. In this scenario, the sort command indicates that data objects 620-623 should be sorted in ascending order based on the year each car was manufactured.

Referring to FIG. 6B, in response to the sort command, application 603 sorts data objects on table 615 based on the year and not the mileage or the price. It should also be noted that data objects 20-623 are sorted in ascending order as indicated by the sort command received in FIG. 6A. It should be noted that although not shown in FIG. 6B, application 603 may further receive a secondary sort command. For example, after sorting table 615 based on the year of manufacture, application 603 may receive another sort command indicating how data objects having the same value for year should be sorted, such as by price. In this example, the primary sort command is based on the year and the secondary sort command is based on the price.

FIG. 7 illustrates computing system 701, which is representative of any system or visual representation of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes process 706, which is representative of the processes discussed with respect to the preceding FIGS. 1-6, including arranging process 200. When executed by processing system 702 to enhance a canvas application, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, graphical processing unites, application specific processors, and logic devices, as well as any other type of processing device, combination, or variation.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. Software 705 may include program instructions for implementing arranging process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system to enhance canvas service for graphically organizing content in a user interface. Indeed, encoding software 705 on storage system 703 may transform the physical structure of storage system 703. The specific transformation of the physical structure may depend on various factors in different implementations of this description. Such factors may include, but are not limited to, the technology used to implement the storage media of storage system 703 and whether the computer-storage media are characterized as primary or secondary storage, as well as other factors.

If the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. User interface system 709 may also include associated user interface software executable by processing system 702 in support of the various user input and output devices discussed above.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

EXAMPLE 1

A computer apparatus comprising: one or more computer readable storage media; a processing system operatively coupled to the one or more computer readable storage media; and an application stored on the one or more computer readable storage media and comprising program instructions for graphically organizing content in a user interface that, when executed by the processing system, direct the processing system to at least: present visual representations of data objects on a canvas in the user interface; receive user input indicative of at least a visual construct for arranging the visual representations of the data objects on the canvas and criteria for arranging the visual representations of the data objects with respect to the visual construct; identify data associated with each of the data objects that relates to the criteria; and place each of the visual representations of the data objects on the visual construct based on the data related to the criteria.

EXAMPLE 2

The computer apparatus of Example 1 wherein the user input comprises digital inking on the canvas that is representative of at least the visual construct and the criteria.

EXAMPLE 3

The computer apparatus of Examples 1-2 wherein the visual construct comprises a graph and the criteria comprises a label for each axis of the graph.

EXAMPLE 4

The computer apparatus of Examples 1-3 wherein the processing system in further configured to: identify a scale for each axis on the graph based on the data associated with each of the data objects; and wherein to place each of the visual representations of the data objects on the visual construct, the processing instructions direct the processing system to place each of the visual representations of the data objects on the visual construct based on the data related to the criteria and the identified scale for each axis on the graph.

EXAMPLE 5

The computer apparatus of Examples 1-4 wherein the visual construct comprises a table and the criteria comprises a label for each column or row on the table.

EXAMPLE 6

The computer apparatus of Examples 1-5 wherein each of the data objects includes metadata indicating the data associated with each of the data objects.

EXAMPLE 7

The computer apparatus of Examples 1-6 wherein each of the data objects includes an embedded link to a data source and wherein to identify data associated with each of the data objects that relates to the criteria, the processing instructions direct the processing system to query the data source for the data associated with each of the data object that relates to the criteria.

EXAMPLE 8

The computer apparatus of Examples 1-7 wherein the processing system is further configured to: receive a sort command on the canvas in the user interface that places select visual representations of data objects on the visual construct; and wherein to place the visual representations of data objects in the visual construct, the processing instructions direct the processing system to sort the visual representations of data objects on the visual construct based on the sort command.

EXAMPLE 9

The computer apparatus of Examples 1-8 wherein the processing system is further configured to: receive an erase command on the canvas in the user interface that is associated with at least one data object or criteria; and remove the at least one data object or criteria from the visual construct when placing the visual representations of data objects on the visual construct.

EXAMPLE 10

A method for graphically organizing content in a user interface to a software application, the method comprising: presenting visual representations of data objects on a canvas in the user interface; receiving user input indicative of at least a visual construct for arranging the visual representations of the data objects on the canvas and criteria for arranging the visual representations of the data objects with respect to the visual construct; identifying data associated with each of the data objects that relates to the criteria; and placing each of the visual representations of the data objects on the visual construct based on the data related to the criteria.

EXAMPLE 11

The method of Example 10 wherein the user input comprises digital inking on the canvas that is representative of at least the visual construct and the criteria.

EXAMPLE 12

The method of Examples 10-11 wherein the visual construct comprises a graph and the criteria comprises a label for each axis of the graph.

EXAMPLE 13

The method of Examples 10-12 further comprising: identifying a scale for each axis on the graph based on the data associated with each of the data objects; and wherein placing each of the visual representations of the data objects on the visual construct comprises placing each of the visual representations of the data objects on the visual construct based on the data related to the criteria and the identified scale for each axis on the graph.

EXAMPLE 14

The method of Examples 10-13 wherein the visual construct comprises a table and the criteria comprises a label for each column or row on the table.

EXAMPLE 15

The method of Examples 10-14 wherein each of the data objects includes metadata indicating the data associated with each of the data objects.

EXAMPLE 16

The method of Examples 10-15 wherein each of the data objects includes an embedded link to a data source and wherein identifying the data associated with each of the data objects that relates to the criteria comprises querying the data source for the data associated with each of the data object that relates to the criteria.

EXAMPLE 17

The method of Examples 10-16 further comprising: receiving a sort command on the canvas in the user interface that places select visual representations of data objects on the visual construct; and wherein placing the visual representations of data objects in the visual construct comprises sorting the visual representations of data objects on the visual construct based on the sort command.

EXAMPLE 18

The method of Examples 10-17 further comprising: receiving an erase command on the canvas in the user interface that is associated with at least one data object or criteria; and removing the at least one data object or criteria from the visual construct when placing the visual representations of data objects on the visual construct.

EXAMPLE 19

One or more computer readable storage media having program instructions stored thereon for graphically organizing content in a user interface to a software application, wherein the program instructions, when executed by a processing system, direct the processing system to at least: present visual representations of data objects on a canvas in the user interface; receive user input indicative of at least a visual construct for arranging the visual representations of the data objects on the canvas and criteria for arranging the visual representations of the data objects with respect to the visual construct; identify data associated with each of the data objects that relates to the criteria; and place each of the visual representations of the data objects on the visual construct based on the data related to the criteria.

EXAMPLE 20

The one or more computer readable storage media of Example 19 wherein the user input comprises digital inking on the canvas that is representative of at least the visual construct and the criteria, and wherein the visual construct comprises a graph and the criteria comprises a label for each axis of the graph.

What is claimed is:
1. A computer apparatus comprising:
one or more computer readable storage media;
a processing system operatively coupled to the one or more computer readable storage media; and
an application stored on the one or more computer readable storage media and comprising program instructions for graphically organizing content in a user interface that, when executed by the processing system, direct the processing system to at least:
present image representations of data objects on a canvas in the user interface, wherein each data object of the data objects represents an entity and comprises data describing the entity, the data describing the entity comprises an image associated with the entity, and each image representation includes the image associated with the entity;
receive a first user input indicating a visual construct for rearranging the image representations of the data objects on the canvas, wherein the first user input is hand-drawn digital inking on the canvas presenting the image representations of the data objects;
receive a second user input indicating criteria for arranging the image representations of the data objects with respect to the visual construct;
receive a third user input indicating a selection of at least a subset of the image representations of the data objects;
identify data that relates to the criteria from each of the at least the subset of the data objects, wherein the data that relates to the criteria comprises at least a portion of the data describing the entity for each of the at least the subset of the data objects; and
rearrange the image representations of the at least the subset of the data objects onto the visual construct based on the data that relates to the criteria.

2. The computer apparatus of claim 1 wherein the second user input is hand-drawn digital inking on the canvas.

3. The computer apparatus of claim 1 wherein the visual construct comprises a graph and the criteria comprises a label for each axis of the graph.

4. The computer apparatus of claim 3 wherein the processing system in further configured to:
identify a scale for each axis of the graph based on the data associated with each data object of the data objects; and
wherein to place the image representations of the data objects on the visual construct, the program instructions direct the processing system to place each image representation on the visual construct based on the data related to the criteria and the identified scale for each axis of the graph.

5. The computer apparatus of claim 1 wherein the visual construct comprises a table and the criteria comprises a label for each column or row on the table.

6. The computer apparatus of claim 1 wherein each data object of the data objects includes metadata indicating the data that relates to the criteria.

7. The computer apparatus of claim 1 wherein each data object of the data objects includes an embedded link to a data source and wherein to identify the data that relates to the criteria, the program instructions direct the processing system to query the data source for the data that relates to the criteria.

8. The computer apparatus of claim 1 wherein the processing system is further configured to:
receive a sort command on the canvas in the user interface that places select image representations of the image representations of the data objects on the visual construct; and
wherein to place the select image representations of data objects in the visual construct, the program instructions direct the processing system to sort the image representations of data objects on the visual construct based on the sort command.

9. The computer apparatus of claim 1 wherein the processing system is further configured to:
receive an erase command on the canvas in the user interface that is associated with at least one of a data object of the data objects and a criterion of the criteria; and
remove the at least one of a data object and the criterion from the visual construct when placing the image representations of data objects on the visual construct.

10. A method for graphically organizing content in a user interface to a software application, the method comprising:

presenting image representations of data objects on a canvas in the user interface, wherein each data object of the data objects represents an entity and comprises data describing the entity, the data describing the entity comprises an image associated with the entity, and each image representation includes the image associated with the entity;

receiving a first user input indicating a visual construct for rearranging the image representations of the data objects on the canvas, wherein the first user input is hand-drawn digital inking on the canvas presenting the image representations of the data objects;

receiving a second user input indicating criteria for arranging the image representations of the data objects with respect to the visual construct;

receiving a third user input indicating a selection of at least a subset of the image representations of the data objects;

identifying data that relates to the criteria from each of the at least the subset of the data objects, wherein the data that relates to the criteria comprises at least a portion of the data describing the entity for each of the at least the subset of the data objects; and rearranging the image representations of the at least the subset of the data objects onto the visual construct based on the data that relates to the criteria.

11. The method of claim 10 wherein the second user input is hand-drawn digital inking on the canvas.

12. The method of claim 10 wherein the visual construct comprises a graph and the criteria comprises a label for each axis of the graph.

13. The method of claim 12 further comprising:
identifying a scale for each axis of the graph based on the data associated with each data object of the data objects; and
wherein placing the image representations of the data objects on the visual construct comprises placing each image representation on the visual construct based on the data related to the criteria and the identified scale for each axis of the graph.

14. The method of claim 10 wherein the visual construct comprises a table and the criteria comprises a label for each column or row on the table.

15. The method of claim 10 wherein each data object of the data objects includes metadata indicating the data that relates to the criteria.

16. The method of claim 10 wherein each data object of the data objects includes an embedded link to a data source and wherein identifying the data that relates to the criteria comprises querying the data source for the data that relates to the criteria.

17. The method of claim 10 further comprising:
receiving a sort command on the canvas in the user interface that places select image representations of the image representations of the data objects on the visual construct; and
wherein placing the image representations of data objects in the visual construct comprises sorting the image representations of data objects on the visual construct based on the sort command.

18. The method of claim 10 further comprising:
receiving an erase command on the canvas in the user interface that is associated with at least one of a data object of the data objects and a criterion of the criteria; and
removing the at least one of the data object and the criterion from the visual construct when placing the image representations of data objects on the visual construct.

19. One or more computer readable storage media having program instructions stored thereon for graphically organizing content in a user interface to a software application, wherein the program instructions, when executed by a processing system, direct the processing system to at least:

present image representations of data objects on a canvas in the user interface, wherein each data object of the data objects represents an entity and comprises data describing the entity, the data describing the entity comprises an image associated with the entity, and each image representation includes the image associated with the entity;

receive a first user input indicating a visual construct for rearranging the image representations of the data objects on the canvas, wherein the first user input is hand-drawn digital inking on the canvas presenting the image representations of the data objects;

receive a second user input indicating criteria for arranging the image representations of the data objects with respect to the visual construct;

receive a third user input indicating a selection of at least a subset of the image representations of the data objects;

identify data that relates to the criteria from each of the at least the subset of the data objects, wherein the data that relates to the criteria comprises at least a portion of the data describing the entity for each of the at least the subset of the data objects; and rearrange the image representations of the at least the subset of the data objects onto the visual construct based on the data that relates to the criteria.

20. The one or more computer readable storage media of claim 19 wherein the second user input is hand-drawn digital inking on the canvas, and wherein the visual construct comprises a graph and the criteria comprises a label for each axis of the graph.

\* \* \* \* \*